US008856286B2

(12) United States Patent
Barsness et al.

(10) Patent No.: US 8,856,286 B2
(45) Date of Patent: *Oct. 7, 2014

(54) OPTIMIZED PEER-TO-PEER FILE TRANSFERS ON A MULTI-NODE COMPUTER SYSTEM

(71) Applicant: International Business Machines Corporation, Armonk, NY (US)

(72) Inventors: Eric L. Barsness, Pine Island, MN (US); David L. Darrington, Rochester, MN (US); Amanda Randles, Cambridge, MA (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/787,740

(22) Filed: Mar. 6, 2013

(65) Prior Publication Data
US 2013/0198343 A1 Aug. 1, 2013

Related U.S. Application Data

(63) Continuation of application No. 11/938,415, filed on Nov. 12, 2007.

(51) Int. Cl.
*G06F 15/16* (2006.01)
*H04L 29/08* (2006.01)

(52) U.S. Cl.
CPC .......... *H04L 67/104* (2013.01); *H04L 67/1076* (2013.01); *H04L 67/1063* (2013.01); *H04L 67/06* (2013.01)
USPC .......................................... 709/219; 709/217

(58) Field of Classification Search
CPC ... H04L 67/104; H04L 67/1063; H04L 67/06; H04L 67/1076
USPC .......................................... 709/219, 224, 217
See application file for complete search history.

(56) References Cited

U.S. PATENT DOCUMENTS

| 6,338,112 | B1 | 1/2002 | Wipfel et al. | |
|---|---|---|---|---|
| 2007/0081543 | A1 * | 4/2007 | Brenes et al. | 370/401 |
| 2008/0071907 | A1 * | 3/2008 | Thompson | 709/224 |
| 2008/0141015 | A1 * | 6/2008 | Chalemin et al. | 713/2 |
| 2009/0265473 | A1 | 10/2009 | Hydrie et al. | |

OTHER PUBLICATIONS

Tian et al., High Performance Land Surface Modeling with a Beowulf Cluster, Nov. 22, 2004, pp. 2-14.

* cited by examiner

*Primary Examiner* — Hee Soo Kim
(74) *Attorney, Agent, or Firm* — Martin & Associates, LLC

(57) ABSTRACT

A method and apparatus performs peer-to-peer file transfers on a High Performance Computing (HPC) cluster such as a Beowulf cluster. A peer-to-peer file tracker (PPFT) allows operating system, application and data files to be moved from a pre-loaded node to another node of the HPC cluster. A peer-to-peer (PTP) client is loaded into the nodes to facilitate PTP file transfers to reduce loading on networks, network switches and file servers to reduce the time needed to load the nodes with these files to increase overall efficiency of the multi-node computing system. The selection of the nodes participating in file transfers can be based on network topology, network utilization, job status and predicted network/computer utilization. This selection can be dynamic, changing during the file transfers as resource conditions change. The policies used to choose resources can be configured by an administrator.

2 Claims, 7 Drawing Sheets

OPTIMIZED PEER-TO-PEER FILE TRANSFERS ON A MULTI-NODE COMPUTER SYSTEM

BACKGROUND

1. Technical Field

The disclosure and claims herein generally relate to multi-node computer systems, and more specifically relate to optimized peer-to-peer file transfers on a multi-node computer system.

2. Background Art

Supercomputers and other multi-node computer systems continue to be developed to tackle sophisticated computing jobs. One type of multi-node computer systems begin developed is a High Performance Computing (HPC) cluster called a Beowulf Cluster. A Beowulf Cluster is a scalable performance cluster based on commodity hardware, on a private system network, with open source software (Linux) infrastructure. The system is scalable to improve performance proportionally with added machines. The commodity hardware can be any of a number of mass-market, stand-alone compute nodes as simple as two networked computers each running Linux and sharing a file system or as complex as 1024 nodes with a high-speed, low-latency network.

A Beowulf cluster is being developed by International Business Machines Corporation (IBM) for the US Department of Energy under the name Roadrunner. In a first-of-a-kind design, chips originally designed for video game platforms work in conjunction with systems based on x86 processors from Advanced Micro Devices, Inc. (AMD). IBM System X™ 3755 servers based on AMD Opteron™ technology are deployed in conjunction with IBM BladeCenter® H systems with Cell Enhanced Double precision (Cell eDP) technology. Designed specifically to handle a broad spectrum of scientific and commercial applications, the Roadrunner supercomputer design includes new, highly sophisticated software to orchestrate over 13,000 AMD Opteron™ processor cores and over 25,000 Cell eDP processor cores in tackling some of the most challenging problems in computing. The Roadrunner supercomputer will be capable of a peak performance of over 1.6 petaflops (or 1.6 thousand trillion calculations per second). Designed also with space and power consumption issues in mind, the Roadrunner system will employ advanced cooling and power management technologies and will occupy only 12,000 square feet of floor space, or approximately the size of three basketball courts.

Computer systems such as Roadrunner have a large number of nodes, each with its own processor and local memory but no disk drive for mass storage of data. The nodes are connected with communication network having several levels of Ethernet switches to one or more file servers. In multi-node, diskless clusters, such as the Roadrunner cluster, large amounts of data must be delivered to each node during the boot process. The file servers provide data, application and Kernel operating system files to the nodes. The enormous amount of data sent while booting nodes can affect the normal operation/administration of other nodes on the cluster due to loading on the networks and network switches.

What is needed is an efficient way to distribute the operating system kernels and files to the nodes to improve boot times and reduce switch loading, while reducing the hardware cost and network complexity of the cluster. Without a way to more efficiently distribute data on multiple nodes, multi-node computer systems will continue to suffer from reduced efficiency.

BRIEF SUMMARY

An apparatus and method is described for peer-to-peer file transfers on a High Performance Computing (HPC) cluster such as a Beowulf multi-node computing system. A peer-to-peer file tracker (PPFT) allows operating system, application and data files to be moved from a pre-loaded node to another node of an HPC cluster. A peer-to-peer (PTP) client is loaded into the nodes to facilitate PTP file transfers to reduce loading on networks, network switches and file servers to reduce the time needed to load the nodes with these files to increase overall efficiency of the multi-node computing system. The selection of the nodes participating in file transfers can be based on network topology, network utilization, job status and predicted network/computer utilization. This selection can be dynamic, changing during the file transfers as resource conditions change. The policies used to choose resources can be configured by an administrator.

The description and examples herein are directed to a HPC cluster such as the Roadrunner computer system, but the claims herein expressly extend to other Beowulf clusters and other multiple node computer systems such as the Blue Gene computer system also by IBM.

The foregoing and other features and advantages will be apparent from the following more particular description, and as illustrated in the accompanying drawings.

BRIEF DESCRIPTION OF DRAWINGS

The disclosure will be described in conjunction with the appended drawings, where like designations denote like elements, and.

DETAILED DESCRIPTION

An apparatus and method is described for peer-to-peer file transfers on a High Performance Computing (HPC) cluster. A peer-to-peer file tracker (PPFT) allows operating system, application and data files to be moved from a pre-loaded node to another node of an HPC cluster. A peer-to-peer (PTP) client is loaded into the nodes to facilitate PTP file transfers. Using PTP file transfers reduces loading on networks, network switches and file servers to reduce the time needed to load the nodes with these files, thereby increasing the overall efficiency of the multi-node computing system. The selection of the nodes participating in file transfers can be based on network topology, network utilization, job status and predicted network/computer utilization. This selection can be dynamic, changing during the file transfers as resource conditions change. The policies used to choose resources can be configured by an administrator. The examples herein will be described with respect to the Roadrunner parallel computer developed by International Business Machines Corporation (IBM).

Figure 1:
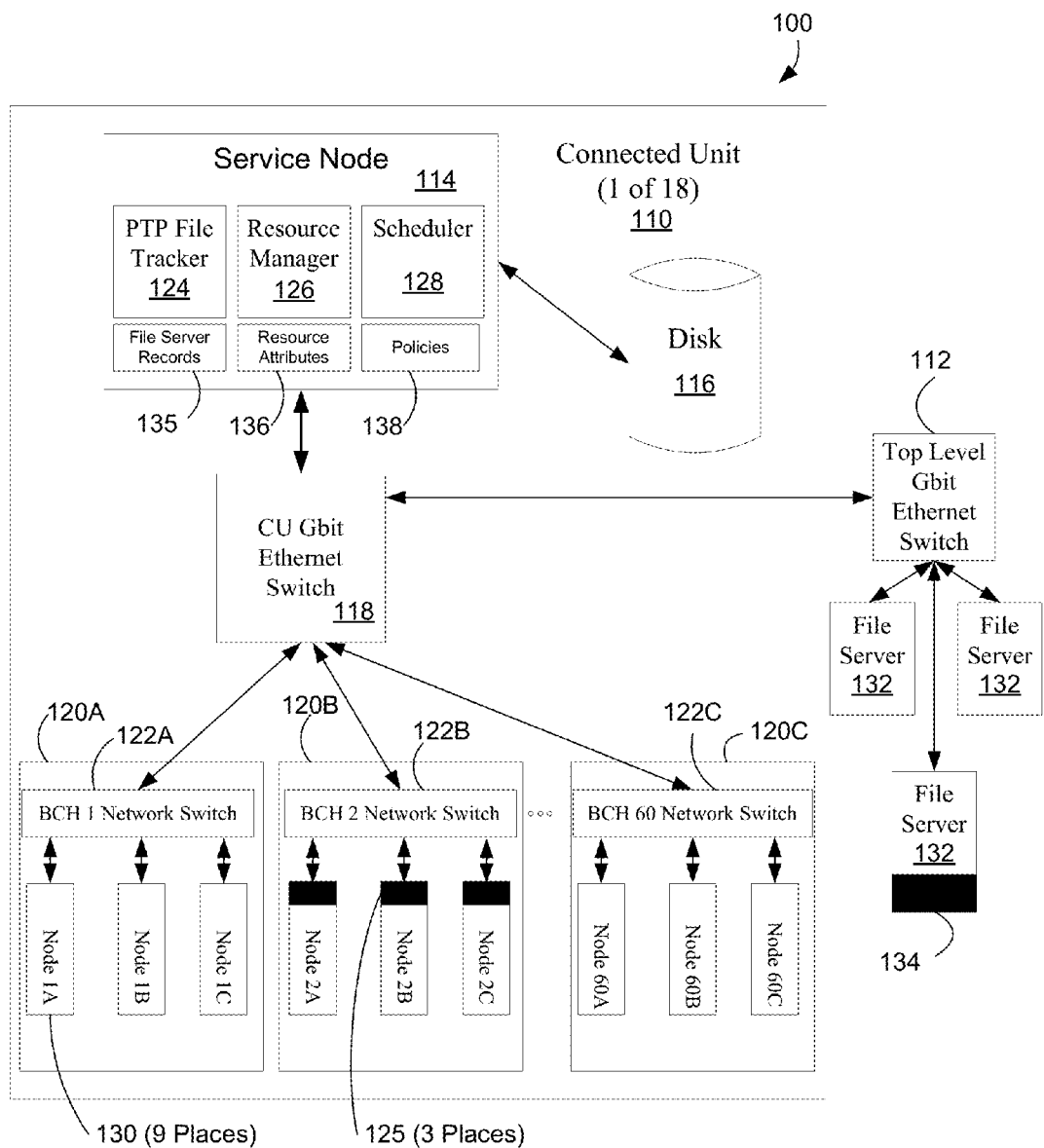
FIG. 1 is a block diagram of a multi-node computer system known as Roadrunner with a PTP file tracker that enables efficient peer-to-peer file transfers between nodes.

FIG. 1 shows a block diagram that represents a multi-node computer system 100 such as the Roadrunner cluster computer system. The Roadrunner computer system 100 consists of eighteen connected units 110 that communicate through a top level gigabit (Gbit) Ethernet switch 112. Each of the connected units 110 is a substantial amount of equipment housed in 16 computer racks. A single connected unit (CU) 110 is illustrated in the figures for simplicity. The connected unit includes a service node 114 that communicates with a disk storage unit 116. The service node 114 further communicates over a CU Gbit Ethernet switch 118 to a number of blade center chassis (BCH) 120A-C.

Each connected unit 110 typically has 60 BCHs. BCH1 120A, BCH2 120B and BCH60 120C are shown in FIG. 1 for illustration. Each BCH has three nodes 124. In Roadrunner, the nodes are sometime referred to as "hybrid nodes' since they each have three "blades" where a blade is a circuit board with one or more processors and related circuits such as processor memory. In Roadrunner, there are Opteron Blades (model LS21) and Cell eDP Blades (Model QS22). The LS21 has 2 Dual core Opteron chips, and the QS22 has 2 dual core Cell eDP chips. A 'hybrid node' is composed of 1 LS21 and 2 QS22 blades. Nodes participating in peer-to-peer transfers have a peer-to-peer client 125 described more fully below.

Each BCH 120A-C has a network switch 122A-C that is connected to the CU Gbit Ethernet switch 116 to allow each BCH to communicate with any other BCH in the CU 110. Further, a BCH 120A-C can communicate with a BCH in another CU (not shown) through the top level switch 112. The top level switch 112 is also a Gbit Ethernet switch. The top level switch 112 connects the connected units 110 to a number of file servers 132. The file servers include a peer-to-peer client 134 to cooperate in peer-to-peer transfers as described further below.

Again referring to FIG. 1, the multi-node computer system 100 includes a service node 114 that handles the loading of the nodes with software and controls the operation of the CU. The service node 114 includes a peer-to-peer file tracker (PPFT) 124, a resource manager 126 and a scheduler 128. The job scheduler 128 in the service node handles allocating and scheduling work and data placement on the compute nodes 130. The job scheduler 128 loads a job from disk storage 116 or from the file servers 132 for placement on the compute nodes. Before starting a new job, the job scheduler 128 may request the PPFT 124 to reserve the nodes so they will not be loaded with peer-to-peer traffic, and then release the nodes when the job is completed. This could be done for all jobs or just for jobs with priority over peer-to-peer transfers. The resource manager manages and monitors resources used by the system including the disk 116, Ethernet switches 118, 112 and the file servers 132. The service node 114 is shown as a part of the connected unit 110. Alternatively, some or all of functions of the service node may be located in a management unit (not shown) that is at the top level of the system 100 and is connected to the top level Gbit Ethernet switch 112.

The PPFT 124 on the service node 114 is responsible for managing the collection of servers that are participating in a peer-to-peer file transfer. The PPFT uses input from the resource manager 126, and the scheduler 128 to determine how to add and remove nodes from participating in the peer-to-peer transfer. Information about files and servers participating in the peer-to-peer transfers are stored in file server records 135. The selection of the nodes participating in file transfers can be based on resource attributes 136 such as network topology, network utilization, job status and predicted network/computer utilization. Further, historical information for these resource attributes may also be used for selection of participating nodes. The selection of participating nodes can be dynamic, changing during the file transfers as conditions or the resource attributes change as described below. The determination of which nodes will participate in the transfers can be done by the peer-to-peer client 125 or the PPFT 124.

The PPFT can use policies 138 (FIG. 1) configured by an administrator in conjunction with the resource attributes to set up peer-to-peer transfers. For example, resource attributes include attributes such as utilization characteristics of specific networks, Ethernet switch loading metrics and CPU utilization. A policy that could be set by an administrator for network utilization includes a percentage of network loading. Similarly, a policy for CPU utilization could be some percentage of CPU utilization. In this manner, the network administrator can set up the policies as parameters against the resource attributes to control the peer-to-peer transfers in the system. The resource attributes are metrics that can be measured or inferred about the system's resources.

As described above, the job scheduler handles allocating and scheduling work and data placement on the compute nodes. This includes user jobs or other jobs sent to a group of nodes for execution. Before starting a new job, the job scheduler 128 may request the PPFT 124 to reserve the nodes so they will not be burdened with peer-to-peer traffic while a job is executing on the node. The job scheduler then releases the nodes when the job is completed. When the scheduler 128 attempts to reserve a node, if the node has an active file tracker session, meaning it is currently being used for a file transfer, then the PPFT sends a tracker update to the nodes in the transfer to dynamically adjust which nodes are participating in the file transfer while the file transfer is in progress. The dynamic adjusting of nodes in the peer-to-peer file transfer is described further below with reference to FIG. 5 and FIG. 6.

Figure 2:
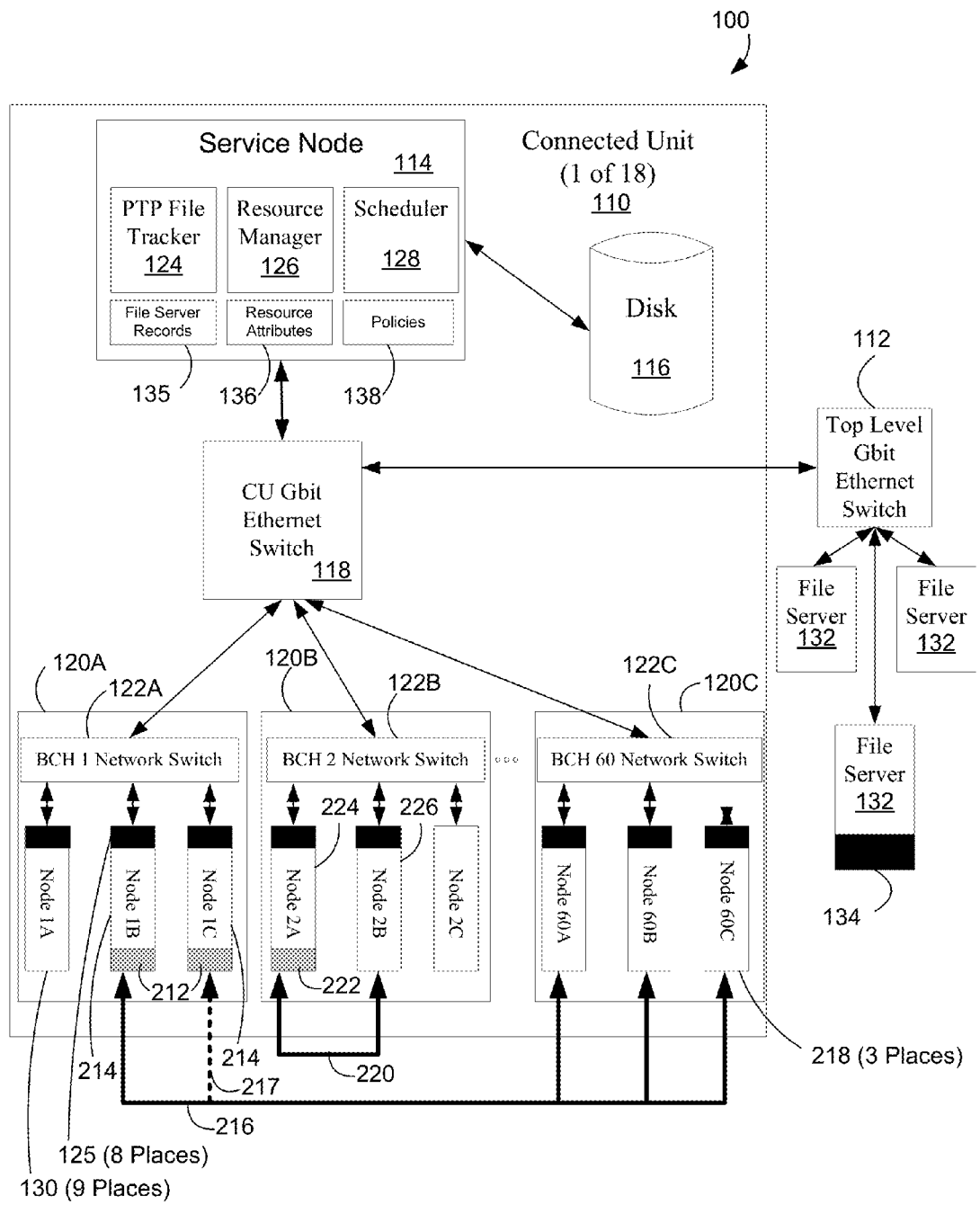
FIG. 2 is a block diagram of multi-node computer system shown in FIG. 1 that illustrates nodes with a peer-to-peer client conducting file transfers to peer nodes.
Figure 3:
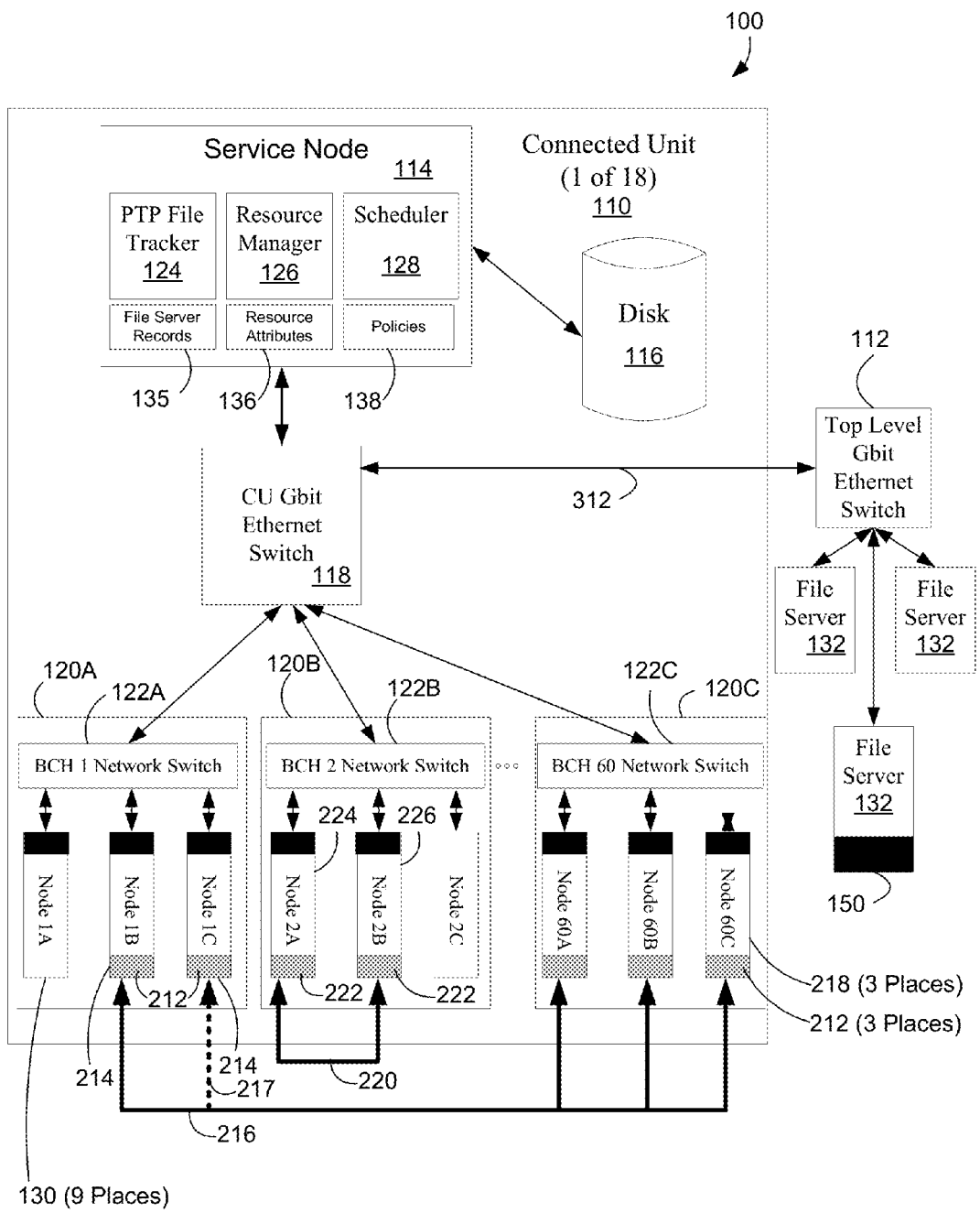
FIG. 3 is a block diagram of the multi-node computer system shown in FIG. 2 illustrating the nodes after the peer-to-peer files transfers.

Referring now to FIGS. 2 and 3, two examples of peer-to-peer file transfers will be described. FIG. 2 shows the initial state for each of the example peer-to-peer transfers. In the first example, a peer-to-peer transfer 216 is made between nodes in different BCHs 120A and 120C. A source file 212 on source nodes 214 (Node 1B and Node 1C) will be transferred 216 to three destination nodes 218, which are the three nodes of BCH 60 120C. The source nodes 214 and destination nodes 218 each have a peer-to-peer client 125 that has been loaded prior to the peer-to-peer transfer. The PPFT determines that the file transfer will be sourced by Node 1B 214 and sets up the peer-to-peer client on Node1B. The determination of the source nodes is made as described herein using the file server records 134, resource attributes 136 and policies 138. The peer-to-peer file transfer 216 is then made to move the source file 212 to the destination nodes 218 (Nodes 60A-C). FIG. 3 shows the source file 212 has been copied to the destination nodes 218. The file transfer is made through the CU Gbit Ethernet switch 118. The file transfer line 216 is shown for reference only. Since the transfer does not use the top level switch 112 or the file servers 132, the loading on these resources is reduced. The source file may be a system file such as an operating system kernel being loaded to boot the destination node or it may be a data file.

Again referring to FIG. 2, the first example and the transfer 216 illustrates that the peer-to-peer file transfer can have a dynamically changing source. As shown in FIG. 2 and described above, the file transfer 216 has source nodes 214 and destination nodes 118. In the case where Node 1C is no longer available for peer-to-peer transfers, the job scheduler it sends a reserve node request to the PTPT, the PTPT determines there is a current transfer session for the node. The PTPT then sends a tracker update to the peer-to-peer client. The node is then removed from the file transfer. The dynamic nature of the source for this example is indicated by a dotted portion 217 of the file transfer 216. This implies that Node 1C begins the peer-to-peer transfer as a source, but then is removed and Node 1B is then sole source node.

Again referring to FIG. 2, a second example of a peer-to-peer file transfer is also shown. In the second example, a peer-to-peer transfer 220 is made between nodes in the same BCH 120B. A source file 222 on Node 2A 224 will be transferred to a destination node 226 (Node 2B on BCH 2 120B). The source and destination nodes each have a Peer-to-peer client 125, and the peer-to-peer transfer is set up by the PPFT as described above for the previous example. The peer-to-peer file transfer 220 is then made to move the source file 222 to the destination node 226. FIG. 3 shows the source file 222 has been copied to the destination node 226. The file transfer is made through the BCH 2 network switch 122B. The file transfer line 218 is shown for reference only. Since the transfer does not use the top level switch 112, the file servers 132, or the CU Gbit Ethernet switch 118, the loading on these resources is reduced.

Figure 9:
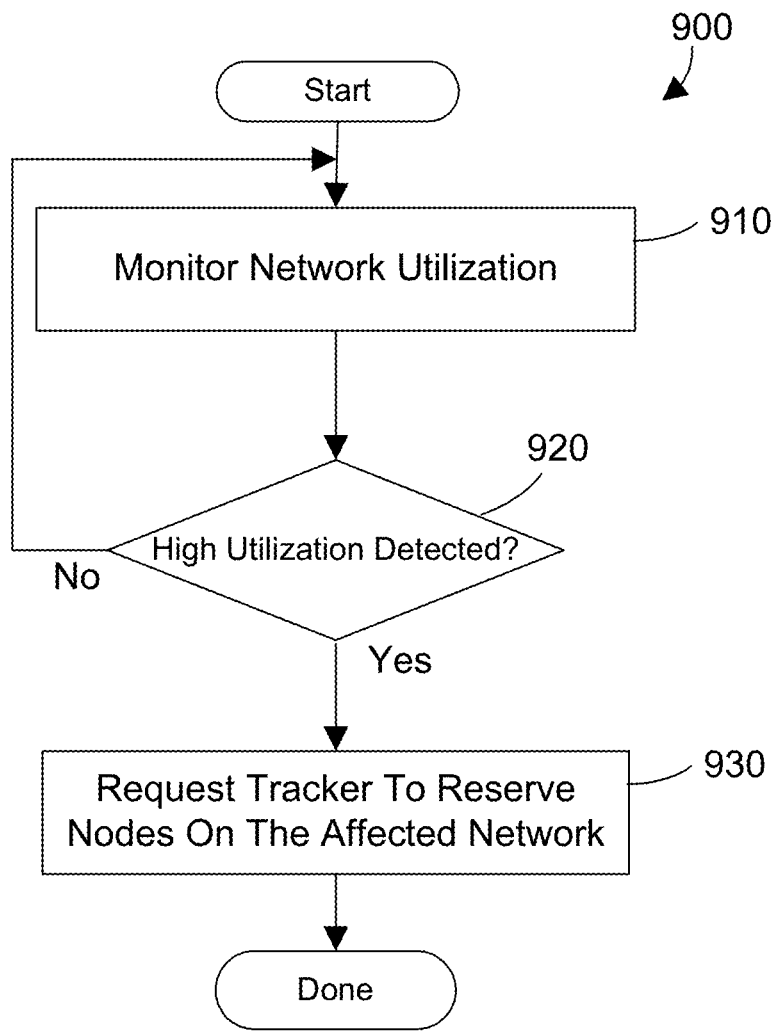
FIG. 9 is a method flow diagram for a resource manager to monitor network utilization on a multi-node computer system.

As introduced above, the selection of the nodes participating in file transfers can be based on resource attributes 136 such as network topology, network utilization, network switch loading, file server loading, and job status. Predicted and historical information for resource attributes can also be used where they can be determined. The examples above illustrate how the nodes are selected based on network topology. In the second example, the transfer source is determined to be a node in the same BCH that has the needed file. A transfer from a node in the same BCH is based on the topology feature of a node that communicates through the local BCH network switch so that there is no network traffic at higher levels of the topology. An example of selecting a node based on network utilization is shown in FIG. 9. In that case, the resource manager determines to reserve nodes from participating in peer-to-peer transfers where the transfers increase traffic on the network with high utilization. Similarly, the resource manager can change the participation based on file servers and network switch loading.

In the examples herein, the selection of nodes participating in the file transfer is determined by the peer-to-peer client 125. Alternatively, the selection of nodes to participate in the file transfer could be made by the PPFT. This could be done by the PPFT selecting only those file server records to send to the peer-to-peer client that contain information for the selected nodes. The client makes transfers based on the file server records sent from the PPFT. Thus, where the file server records are screened to include only those records that are selected based on the resource attributes and policies, the client will be making the transfer based on those resource attributes and policies.

Job status can also be used to determine nodes that participate in peer-to-peer transfers. For example, if a job has an idle status or waiting for an event, then the node could be used for peer-to-peer transfers. Similarly, if the job has a low priority status, then the node could be used for peer-to-peer transfers while executing the job. The status of the jobs can be used in conjunction with policies set by a system administrator. For example, a policy may indicate what priority a job is allowed before peer-to-peer transfers are allowed on the node executing the job.

Figures 4, 5:
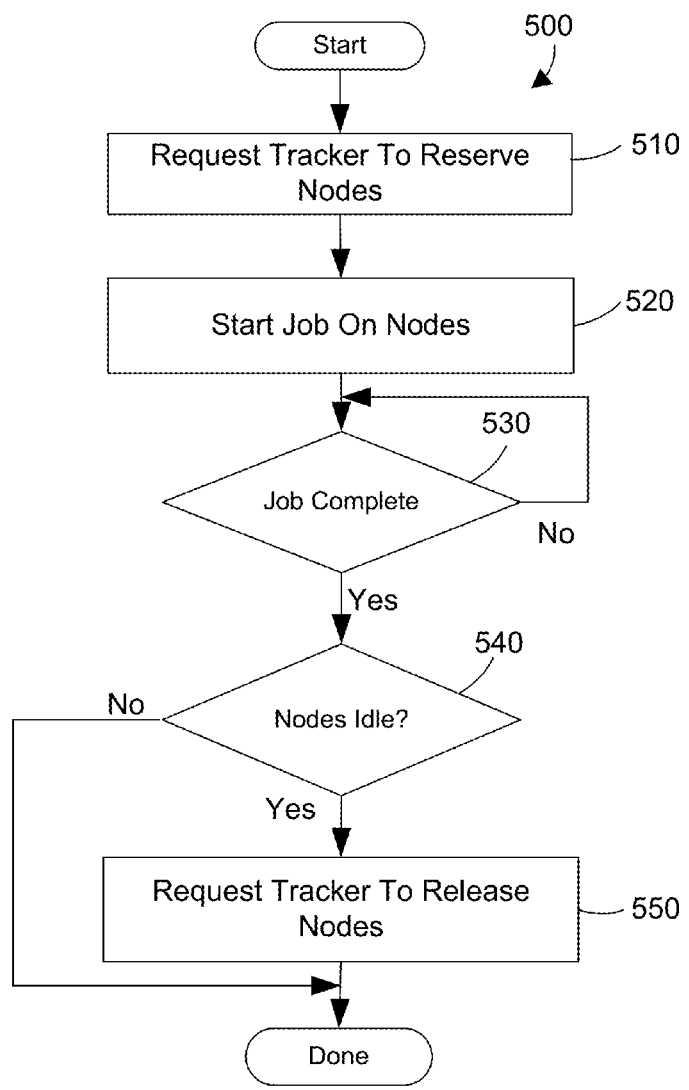
FIG. 4 is a block diagram of a file server record that contains information for each file and file server participating in peer-to-peer files transfers.
FIG. 5 is a method flow diagram for a job scheduler to work with a file tracker that supports peer-to-peer file transfers on a multi-node computer system.

FIG. 4 illustrates a block diagram that represents an example of a file server record (135 in FIG. 1). The file server record 135 contains information for each file and file server participating in peer-to-peer files transfers. The file server records are created prior to or at the startup of the peer-to-peer transfer operations described below. The records could be created by a system administrator or by the resource manager 126. The file server records contain a reference to a server 410, filename 412, total number of segments in the file 414, the starting segment number 416, ending segment number 418 and an availability flag 420. The server 410 indicates the source of the peer-to-peer file which could be a file server or a node. The filename 412 indicates the name of the file to be transferred. The total number of segments 414 refers to the number of segments the file indicated by the filename 412 is divided into. The starting segment number 416, and ending segment number 418 allow files to be divided into smaller pieces for transfer across a group of nodes. This allows the PPFT to handle large files and also allows file transfers to begin before a file is completely in place at the source of the transfer (server 410). In general, the file segment information allows finer grain control over where files are available and in a memory constrained system, pieces of files can be served from different nodes. The availability flag 420 allows the PPFT to control the availability of peer-to-peer transfers of the file to be dynamically turned on and off. This allows a busy node to be allowed to execute without peer-to-peer transfers.

FIG. 5 shows a method 500 for a job scheduler to work with a file tracker that supports peer-to-peer file transfers on a multi-node computer system. The steps in method 500 are performed by the job scheduler 128 in the service node 114 (FIG. 1). This method assumes that the job overrides using the node for peer-to-peer traffic, but other variations of the method could use the job status to determine the node's availability to participate in peer-to-peer transfers as discussed above. The method begins by requesting the tracker to reserve nodes needed for the transfer job (step 510). To reserve nodes means to disable peer-to-peer transfers so the job can run without the burden of peer-to-peer transfers also running on the node. The method then starts the job on the nodes (step 520). If the job is not completed (step 530=no) then wait by returning to step 530. If the job is complete (step 530=yes) then check to see if the nodes the job was executing on are idle (step 540). If the nodes are not idle (step 540=no) then the method is done. If the nodes are idle (step 540=yes) then request the tracker to release the nodes from to the pool of nodes to supply this file (step 550). The method is then done.

Figure 6:
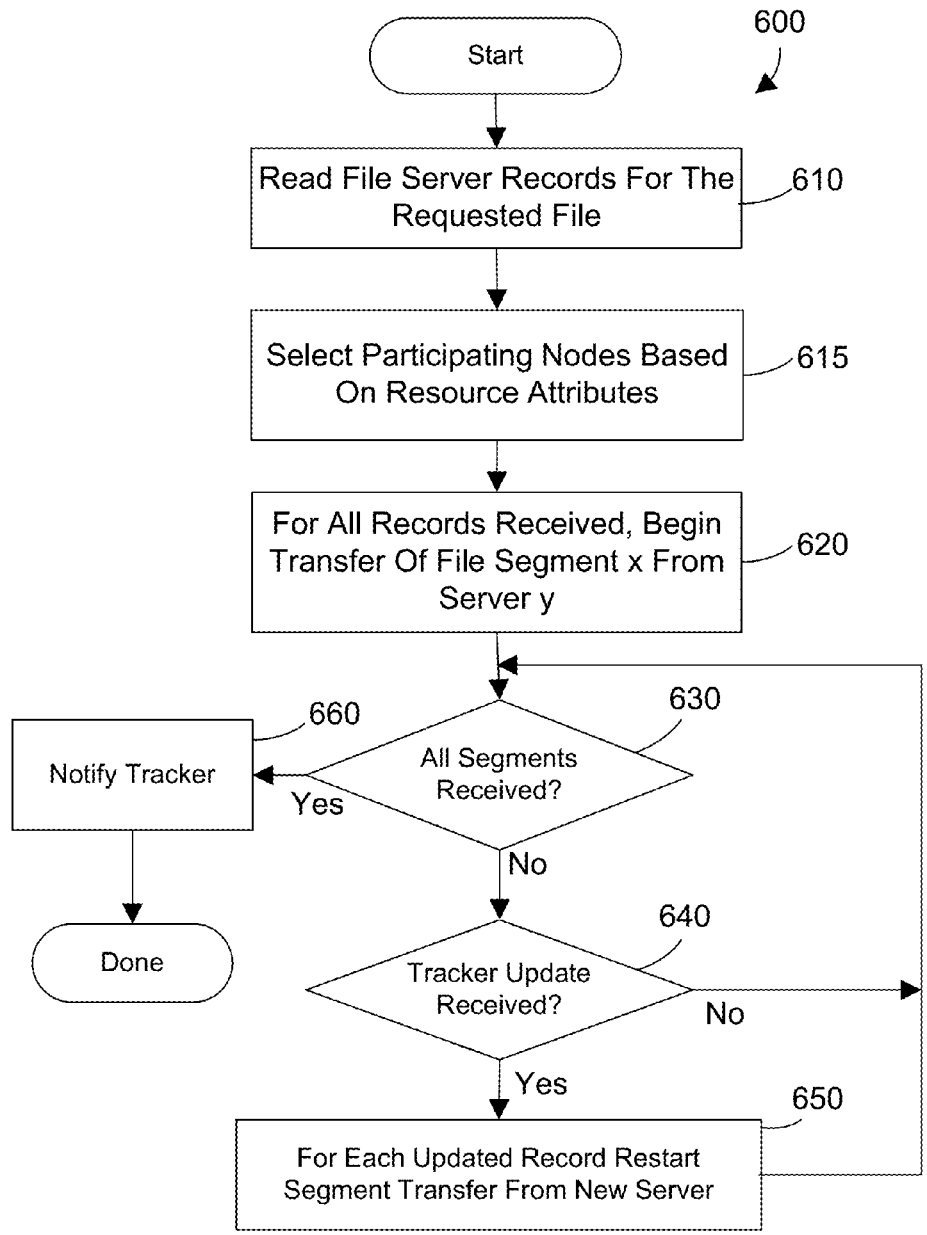
FIG. 6 is a method flow diagram for a client node to perform peer-to-peer transfers on a multi-node computer system.

FIG. 6 shows a method 600 for a peer-to-peer client to perform peer-to-peer transfers on a multi-node computer system. The steps in method 600 are performed by a peer-to-peer client 125 executing on a node 124 (FIG. 1) of multi-node computer system. The client reads the file server records for the requested file from the file tracker (step 610). This requests starts a tracker peer-to-peer session on the tracker. The client selects participating nodes based on the resource attributes (step 615). The client then uses the records received to begin parallel transfer of file segments (x variable number of segments) from the different servers (y variable number of servers) indicated in the records (step 620). If all the segments have not been received (step 630=no) then check if a tracker update has been received (step 640). If there are no tracker updates (step 640=no) then go back to step 630. If there has been a tracker update (step 640=yes) then for each updated record, dynamically adjust the group of nodes in the file transfer by restarting the segment transfer from the new server (step 650) and return to step 630. Thus when there is a file tracker update from the scheduler that changes the nodes available for the transfer, the tracker dynamically adjusts the source of the file transfer by restarting segments of the transfer from a new server for segments of the file transfer that are no longer available as indicated by the file tracker update. When all the segments have been received (step 630=yes) then notify the tracker the transfer is complete (step 660). The method is then done and the tracker will close the transfer session upon the notification from the client that the transfer is complete.

Figure 7:
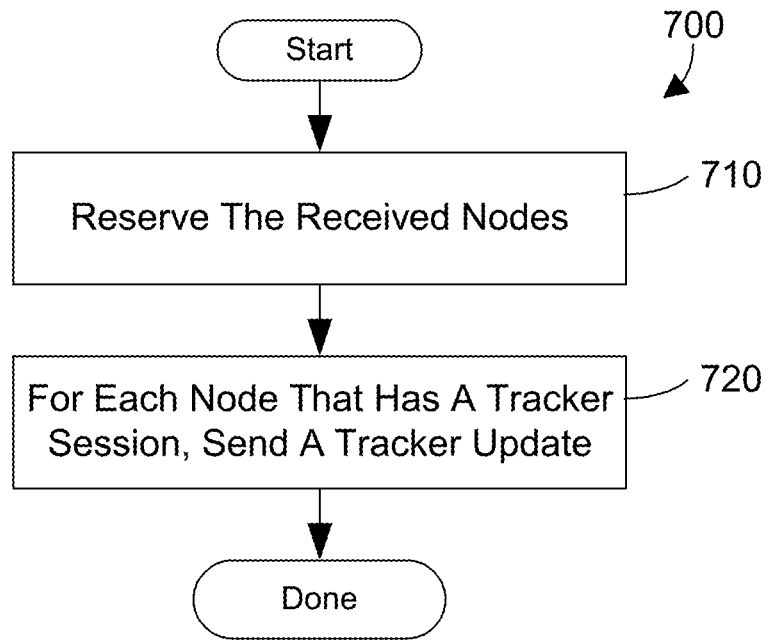
FIG. 7 is a method flow diagram for a job scheduler to notify a peer-to-peer tracker to reserve a node on a multi-node computer system.

FIG. 7 shows a method 700 for a peer-to-peer tracker to reserve a node on a multi-node computer system as a possible response to step 510 in method 500 described above. The steps in method 700 are performed by a peer-to-peer tracker 124 (FIG. 1) on the service node of the multi-node computer system. In method 700, the tracker reserves the requested nodes (step 710). For each node that has an active tracker session, the tracker sends a tracker update (step 720). The method is then done.

Figure 8:
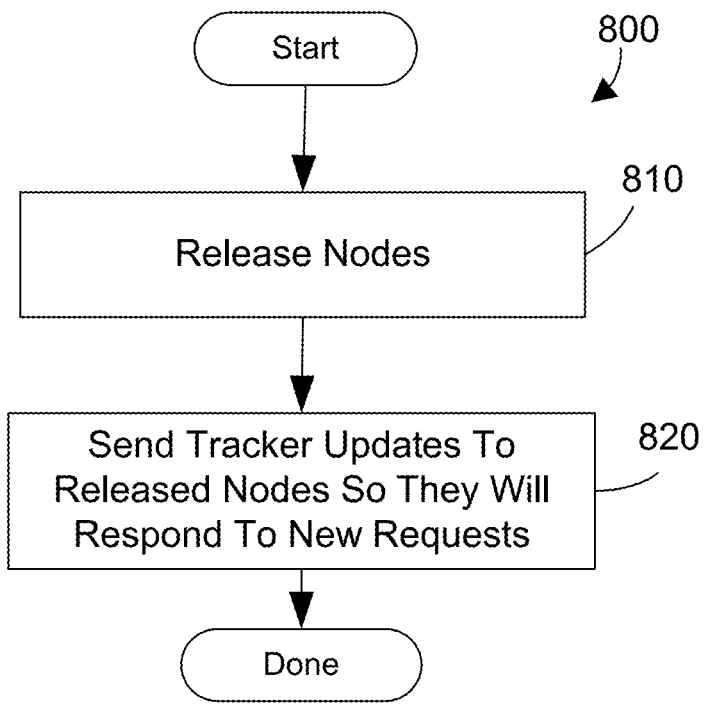
FIG. 8 is a method flow diagram for a job scheduler to notify a peer-to-peer tracker to release a node on a multi-node computer system.

FIG. 8 shows a method 800 for a peer-to-peer tracker to reserve a node on a multi-node computer system as a response to step 550 in method 500 described above. The steps in method 800 are performed by a peer-to-peer tracker 124 (FIG. 1) on the service node of the multi-node computer system. In method 800, the tracker releases the nodes received from the scheduler (step 810) and then sends tracker updates to released nodes so they will be able to respond to new job file transfer requests (step 820). The method is then done.

FIG. 9 shows a method 900 for a resource manager to monitor network utilization on a multi-node computer system. The resource manager controls Peer-to-peer transfers based on the network utilization to ensure the networks are not overloaded by the additional network traffic. For example, if the network traffic is high in a particular BCH, then the tracker can be requested to reserve the nodes of that BCH, meaning to disable peer-to-peer clients in the BCH from being a server for peer-to-peer transfers. Of course this may increase the network loading in other places, but it may be necessary to reduce loading in this BCH. The steps in method 900 are performed by a resource manager 126 (FIG. 1) of multi-node computer system to monitor resource utilization on the system. The resource manager monitors the network utilization (step 910) and determines if high utilization of resources is detected (step 920). If there is no determination of high utilization (step 920=no) then continue checking by returning to step 910. If there is a determination of high utilization (step 920=yes) then request the tracker to reserve nodes on the affected network (step 930). The method is then done, or it may be a continuous loop and return to step 910.

An apparatus and method is described herein to provide peer-to-peer file transfers on a multi-node computer such as the Roadrunner cluster computer system. A peer-to-peer file tracker allows system, application and data files to be moved from a pre-loaded node to another node of an HPC cluster. The peer-to-peer file transfer reduces the loading on network switches and file servers and thereby increases the efficiency of a multi-node, clustered computer system.

One skilled in the art will appreciate that many variations are possible within the scope of the claims. Thus, while the disclosure has been particularly shown and described above, it will be understood by those skilled in the art that these and other changes in form and details may be made therein without departing from the spirit and scope of the claims.

The invention claimed is:

1. A computer implemented method for a peer-to-peer file transfer in a plurality of nodes in a multi-node computer cluster, the method comprising the steps of:
providing a service node connected to the plurality of nodes, wherein the service node includes a resource manager that manages and monitors storage and network resources used by the system, and a scheduler that handles allocating and scheduling work and data placement on the compute nodes, wherein the resource manager and the resource scheduler provide resource attributes to dynamically adjust which nodes of the plurality of nodes participate in a peer-to-peer file transfer of a requested file;
reading file server records for a the requested file;
selecting a plurality of participating nodes from the plurality of nodes for the peer-to-peer file transfer based on the resource attributes;
transferring file segments of the requested file from the plurality of participating nodes based on the file server records;
a peer-to-peer client dynamically adjusting the nodes participating in the peer-to-peer file transfer in response to a file tracker update sent from the peer-to-peer file tracker with updated resource attributes in the file tracker update from the resource manager and the resource scheduler by restarting segments of the transfer from a new source node;
monitoring network utilization of networks of the multi-node computer system and where high utilization of a network is detected disabling peer-to-peer traffic for nodes using the detected network;
wherein the resource attributes include the following: network topology, network utilization, network switch loading, file server loading, job status and historical information related to the resource attributes;
wherein the peer-to-peer client dynamically adjusts the nodes participating in the peer-to-peer file transfer while the file transfer is in progress; and
wherein the resource attributes are used in conjunction with policies determined by a system administrator.

2. The computer implemented method of claim 1 wherein the peer-to-peer file transfer copies an operating system kernel from a source node to a destination node on the cluster in a process of booting the destination node.

* * * * *